United States Patent
Poedjono

(10) Patent No.: US 6,751,555 B2
(45) Date of Patent: Jun. 15, 2004

(54) METHOD AND SYSTEM FOR DISPLAY OF WELL LOG DATA AND DATA ANCILLARY TO ITS RECORDING AND INTERPRETATION

(75) Inventor: Benny Poedjono, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 39 days.

(21) Appl. No.: 10/167,031

(22) Filed: Jun. 11, 2002

(65) Prior Publication Data

US 2003/0074139 A1 Apr. 17, 2003

Related U.S. Application Data

(60) Provisional application No. 60/329,933, filed on Oct. 17, 2001.

(51) Int. Cl.[7] .................................................. G01V 1/40
(52) U.S. Cl. ........................................... 702/6; 702/16
(58) Field of Search .................... 702/6, 16; 166/254.2; 340/853.2, 853.7

(56) References Cited

U.S. PATENT DOCUMENTS

| | | | |
|---|---|---|---|
| 4,633,446 A | | 12/1986 | Kesner |
| 4,794,534 A | * | 12/1988 | Millheim ........................ 702/9 |
| 5,237,539 A | * | 8/1993 | Selman ......................... 367/69 |
| 5,360,967 A | * | 11/1994 | Perkin et al. ................. 235/375 |
| 5,873,049 A | | 2/1999 | Bielak et al. |
| 5,924,049 A | | 7/1999 | Beasley et al. |
| 5,995,965 A | | 11/1999 | Experton |
| 6,012,018 A | | 1/2000 | Hornbuckle |
| 6,035,255 A | | 3/2000 | Murphy et al. |
| 6,055,481 A | | 4/2000 | Johansen et al. |
| 6,070,125 A | | 5/2000 | Murphy et al. |
| 6,101,445 A | | 8/2000 | Alvarado et al. |
| 6,128,577 A | | 10/2000 | Assa et al. |
| 6,138,075 A | | 10/2000 | Yost |
| 6,195,092 B1 | | 2/2001 | Dhond et al. |
| 6,215,499 B1 | | 4/2001 | Neff et al. |
| 6,366,988 B1 | | 4/2002 | Skiba et al. |
| 6,519,568 B1 | * | 2/2003 | Harvey et al. .................. 705/1 |
| 2002/0055868 A1 | * | 5/2002 | Dusevic et al. ................. 705/9 |
| 2002/0169645 A1 | * | 11/2002 | Aronstam et al. .............. 705/7 |

OTHER PUBLICATIONS

D. Berta & D. Burleigh, "Innovative IT Tools Help Manage Extensive Field Operations," *World Oil*, pp. 55–61 (Jan. 2000).

* cited by examiner

*Primary Examiner*—Marc S. Hoff
*Assistant Examiner*—Anthony Gutierrez

(57) ABSTRACT

A system and method for viewing well log data. An identifier associated with a wellbore is entered into a display device at a first location. The well identifier is transmitted to a first database at a second location having well log data or ancillary data therein. The well log data or ancillary data are sent to the first location, and a table of contents indexing the data is generated for display on the display device. The table having selection fields linked to multiple data dimensions so that random selection by a user displays the selected data on the display device.

29 Claims, 12 Drawing Sheets

| CONTENTS | | 79 |
|---|---|---|
| 80 — 3 | PERSONNEL<br>CLIENT REPRESENTATIVE, FIELD ENGINEER. | |
| 81 — 4 | FIELD<br>WELL MAP, CORRELATION LOG | |
| 82 — 5 | WELL<br>RIG DIAGRAM, WELL DESIGN, TRAJECTORY PLOT, MUD PROPERTY | |
| 83 — 7 | EQUIPMENT DIAGRAM (BHA)<br>SERIAL NUMBER, LENGTH, MEASURE POINT, SENSOR ORIENTATION,<br>STABILIZER SIZE | |
| 84 — 8 | SOFTWARE<br>SURFACE AND DOWNHOLE | |
| 85 — 9 | CALIBRATION<br>TOOL SET UP, RESULT AND LIMIT (GRAPHICAL PRESENTATION) | |
| 86 — 10 | ENVIRONMENT CORRECTION<br>BOREHOLE, FORMATION | |
| 87 — 15 | REMARK<br>OPERATING, CONDITION, ENVIRONMENTAL, ANOMALY,<br>DEPTH DISCREPANCY | |
| 88 — XX | JOB PLANNING<br>OBJECTIVES, DATA REQUIREMENT, OPERATING PROCEDURE AND<br>LIMITATIONS | |
| 89 — 20 | ACQUISITION<br>DEPTH REFERENCE, FILTERING, REAL TIME AND<br>RECORDED UPDATE RATO, | |
| 90 — YY | DIGITAL PRODUCT<br>DIGITAL VERIFICATION, TAPE VERIFICATION | |
| 91 — 22 | MAIN LOG<br>RECORDED MODE, 650m - 2330m, MEASURED DEPTH | |

FIG. 6

| MECHANICAL SPECIFICATIONS ||
|---|---|
| VISION675 | |
| GENERAL: | |
| DRILL COLLAR NOMINAL OD | 6.75" API TOLERANCES |
| COLLAR CONNECTIONS | API 5-1/2" FH BOX-TOP AND BOTOM COLLAR-NC-50 BOX |
| MAKE UP LENGTH | 17.5 FT (20.5 FT W/PONY) |
| MAX TEMERATURE | 300° F |
| TOTAL TOOL WEIGHT | 1700 LBS |
| BENDING: | |
| MAX TOOL CURVATURE | ROTATING 4.5 DOG/100 FT SIDING: 16 DOG/100 FT |
| BENDING STRENGTH RATIO | 1.95 (BSR) |
| EQUIVALENT BENDING STIFFNESS | 27.4 FT OF COLLAR |
| AVERAGE INERTIA (IN") | 8.3 |
| AXIAL: | |
| MAXIMUM WEIGHT ON BIT | F=74,000,000/L (L=DISTANCE BETWEEN STABILIZERS IN FT) |
| MAXIMUM JARRING LOAD | 330,000LBS |
| TORQUE: | |
| JOINT MAKE-UP TORQUE | 23,000 FT-LBS |
| MAXIMUM ROTARY | 16,000 FT-LBS |
| MAXIMUM TORQUE | 46,000 FT-LBS |
| HYNDRAULICS: | |
| OPERATING PRESSURE | 20,000 PSI |
| MAXIMUM FLOW RATE | 800GPM |
| PRESSURE ROP | = MUD WT (PPG) X (GPM) / 235,000 (800 GPM: 11 PPG MUD = 30 PSI) |
| 6.75 IN. VON | |

FIG. 11

| CALIBRATION | SUMMARY | | |
|---|---|---|---|
| D&I S/N : | MDI-6A 230 | GAMMA RAY S/N | MGR-DA230 |
| CAL. EQ. SERIAL NUMBER | DITS-GA 12 | CAL. EQ. SERIAL NUMBER | GSR-EA 12 |
| DATE / TIME | 2001-12-23T12:45 | DATE / TIME | 2001-12-16T12:45 |
| PERFORMED BY | | PERFORMED BY | |
| SOFTWARE VERSION | DITS-D&123.35 XA | SOFTWARE VERSION | DITS-DR 23.35 XA |
| TRACEABILITY | MANUAL INPUT | TRACEABILITY | IMPORTED |
| VALIDITY | YES ◉ | VALIDITY | NO ◉ |
| FILE NAME / URL | MD1230CAL.DA1 | BLANKET CHECK = 160 gAPI | 155 gAPI +/-3 gAPI |
| | | FILE NAME / URL | GR230CAL.DAT |
| DENSITY S/N | | NEUTRON S/N | |
| CAL. EQ. SERIAL NUMBER | AL-56, MG -32 | CAL. EQ. SERIAL NUMBER | NCTB-AA 145 |
| DATE / TIME | 2001-12-24T02:45 | DATE / TIME | 2001-12-24T01:52 |
| PERFORMED BY | | PERFORMED BY | |
| SOFTWARE VERSION | TSS 6. 123 XA.ADN 6.12 | SOFTWARE VERSION | TSS 6.123XA,ADN6.12 |
| TRACEABILITY | IMPORTED | TRACEABILITY | IMPORTED |
| VALIDITY | YES ◉ | VALIDITY | YES ◉ |
| WATER CHECK IS = 1.020 g/cm3 | 1.022 g/cm3 +/-0.015g/cm3 | WATER CHECK BANK #1 = 98.5 pu | 99 pu +/-1.0 pu |
| WATER CHECK SS = 1.110 g/cm3 | 1.115 g/cm3 +/-0.025g/cm3 | WATER CHECK BANK #2 = 99.5 pu | 99 pu +/-1.0 pu |
| FILE NAME / URL | | FILE NAME / URL | |

● SAMPLE OF "TEXT" IS USED TO ACCESS DETAILED CALIBRATION AND HISTORICAL RECORD.

*FIG. 12*

METHOD AND SYSTEM FOR DISPLAY OF WELL LOG DATA AND DATA ANCILLARY TO ITS RECORDING AND INTERPRETATION

CROSS-REFERENCE TO RELATED APPLICATIONS

This invention claims the benefit of U.S. Provisional Application serial No. 60/329,933 filed on Oct. 17, 2001.

BACKGROUND OF THE INVENTION

1. Field of the Invention

The invention relates generally to the field of well log data acquisition and interpretation. More specifically, the invention relates to methods and systems for display of well log data and information ancillary to such well log data as used in interpretation thereof.

2. Background Art

Well logs are measurements, typically with respect to depth, of selected physical parameters of earth formations penetrated by a wellbore. Well logs are typically recorded by inserting various types of measurement instruments into a wellbore, moving the instruments along the wellbore, and recording the measurements made by the instruments. One type of well log recording includes lowering the instruments at the end of an armored electrical cable, and recording the measurements made with respect to the length of the cable extended into the wellbore. Depth within the wellbore is inferred from the extended length of the cable. Recordings made in this way are substantially directly correlated to measurement depth within the wellbore. Another method for measurement is known as "logging while drilling" (LWD) and includes attaching the instruments to the lower portion of a drilling tool assembly used to drill the wellbore. Some of the measurements are made by transmitting them to the surface using a pressure modulation telemetry system, which modulates pressure of a drilling fluid (mud) flowing through the interior of the drilling tool assembly. A much larger amount of well log data is stored in a recording device disposed in the logging instrument, which is interrogated when the instrument is retrieved from the wellbore. This information is typically recorded with respect to time. A record of instrument position in the wellbore with respect to time made at the earth's surface is then correlated to the time/measurement record retrieved from the instrument storage device to generate a conventional "well log" of measurements with respect to wellbore depth.

Well logs are typically presented in a graphic form including a plurality of grids or "tracks" each of which is scaled from a selected lower value to a selected upper value for each measurement type presented in the particular track. A "depth track" or scale which indicates depth in the wellbore, is typically positioned between two of the tracks. Depending on the needs of the particular user, any number of or type of measurements may be presented in one or more of the tracks. A typical well log presentation of an individual measurement is in the form of a substantially continuous curve or trace. Curves are interpolated from discrete measurement values stored with respect to time and/or depth in a computer or computer-readable storage medium. Other presentations include gray scale or color scale interpolations of selected measurement types to produce the equivalent of a visual image of the wellbore wall. Such "image" presentations have proven useful in certain types of geologic analysis.

Interpreting well log data includes correlation or other use of a very large amount of ancillary information. Such information comprises the geographic location of the wellbore (e.g. global positioning satellite data), and geologic and well log information from adjacent wellbores. Other information comprises the types of instruments used, their mechanical configuration and records relating to their calibration and maintenance. Still other types of information include the actual trajectory of the wellbore, which may traverse a substantial geographic distance in the horizontal plane with respect to the surface location of the wellbore. Other information of use in interpreting well log data includes data about the progress of the drilling of the wellbore, the type of drilling fluid used in the wellbore, environmental corrections applicable to the particular logging instruments used.

Methods known in the art for making the ancillary information available to a user of a well log includes transporting physical records to the wellbore, such as by magnetic diskette or paper copy, and including the transported records into the final record of the well log. Inclusion into the final well log may be made by manual entry of data such as by keyboard or other "download" of the data into the recording system which makes the record of the measurements at the wellbore site ("wellsite").

Much of this ancillary information is applicable to any well log recorded with a particular type of well logging instrument. For example, an instrument which measures naturally occurring gamma radiation ("gamma ray") has environmental corrections which correspond only to the type of instrument. As one example, each wireline type gamma ray device of a selected external diameter from a particular wireline operator will have the same environmental corrections for "mud weight" (drilling fluid density). Other types of ancillary information are made available from the wellbore operator (typically an oil and gas producing entity). Examples of this type of information are the geographic location of the wellbore and any information from other wellbores in the vicinity. Still other types of ancillary information include records of initial and periodic calibration and maintenance of the particular instruments used in a particular wellbore.

The foregoing is only a small subset of the types of ancillary information which may be used in interpreting a particular well log. Irrespective of the type of ancillary information, transportation of this information, and its inclusion in each and every well log data record made at a particular wellsite can be expensive and cumbersome, particularly with respect to the needs for storage of such information. Particularly where a large number of wells are logged using similar or the same instruments, or in a geographic location having a large number of closely spaced wellbores, redundant storage of such ancillary information can be expensive and cumbersome.

It is known in the art to transmit well log data substantially in "real time" (at the time of acquisition) from a wellsite to a remote location (such as a user office). See for example, U.S. Pat. No. 6,101,445 issued to Alvarado et al. The system disclosed in the '445 patent is adapted so that a user may view and use well log data as it is being recorded. To use the data in various applications, it is necessary to download or otherwise transfer the received data to the selected application.

U.S. Pat. No. 5,873,049 issued to Bielak et al. discloses a system for using data having a plurality of formats in determining an earth model using application programs adapted to read different types and/or formats of data. The system in the '049 patent has no facility for use of data during acquisition at the wellsite.

U.S. Pat. No. 6,070,125 issued to Murphy et al. discloses a system for providing a geologic interpretation of various forms of data acquired from a wellbore, including well log data, seismic data, and drilling performance data. There is no facility in the system disclosed in the '125 patent for remote access and display of wellbore data ancillary to data recorded at the wellsite.

U.S. Pat. No. 6,128,577 issued to Assa et al discloses a system for modeling and evaluating models of geologic structures from various wellbore data sources. A method disclosed in the '577 patent includes organizing data into a database part and a design part. A shape of a geologic feature determined during feature classification is retained. A feature is divided into a first sub region and a second sub region having a boundary therebetween. A material property is assigned to each sub region. The sub region is divided into a plurality of sub regions, and the material property is propagated to the plurality of sub regions. The method and system disclosed in the '577 patent provides no facility for using data stored at a remote location to view and process data presented and/or recorded at a different location.

U.S. Pat. No. 6,366,988 B1 issued to Skiba et al discloses a method and system for electronic data storage management. The system includes a means for moving data from a first storage location to a new storage destination, means for communicating the new destination to the first storage location, a means for translating the new destination to application programs, so that the application programs do no detect a change in location of the stored data, a means for updating the application programs so that they access data as if they were stored in the first location, and a means for transferring an operating system to the new destination so that the operating system can access the data at the new destination. There is no facility in the system disclosed in the '988 patent for accessing and displaying data ancillary to data recorded at a wellsite.

U.S. Pat. No. 5,237,539 issued to Selman discloses a method and system for processing and displaying data recorded during drilling of a wellbore. The system disclosed in the '539 patent is concerned with presenting data recorded in "real time" (such as rotary drill speed, axial force on a drill bit, and mud pump flow rates) with so-called "lag" data, primarily samples of cuttings made during drilling of the wellbore, which are time delayed due to the amount of time between actual cutting of the rock and delivery of the drill cuttings to the earth's surface from the wellbore. The system disclosed in the '539 patent has no facility for accessing and/or displaying ancillary data to the data recorded at the wellsite.

U.S. Pat. No. 6,195,092 B1 issued to Dhond et al. discloses a software system for creating and editing multiple presentations of data in well log plots. The system includes presenting a spreadsheet-like data editor screen of a graphic user interface, displaying a plurality of well log data objects within the editor screen, displaying attributes of each of the objects in the editor, changing a value of one of the attributes, and automatically applying the changed attribute to the plurality of well log objects. To summarize the problem that is solved by the system in the '092 patent, log presentation systems typically required changing presentation attributes for each display area on a well log, even if there were multiple presentations of the same data type on different parts of the well log. The system of the '092 patent treats each log data parameter as an object. Changes to the attributes of one object propagate to all presentations of that same data object in any particular well log or well logs. There is, however, no facility in the system disclosed in the '092 patent for accessing or using data that are ancillary to the data being processed by the system.

What is needed is a system for access to ancillary well log information which does not require physical transportation or manual data entry to a particular well log record in order to display and use these data.

SUMMARY OF INVENTION

One aspect of the invention is a method for viewing well log data is disclosed. The method includes, entering a wellbore identifier into a remote display device. The display device is at a first location separate from a facility controlled by a well logging operator. The well identifier is transmitted to a first database having ancillary data therein. The first database is controlled by the well logging operator. The ancillary data are sent to the first location, and the ancillary data and data recorded from a well logging instrument disposed in a wellbore are presented on the display device.

Another aspect of the invention is a method for viewing well log data. The method according to this aspect includes selecting a well identifier, accessing well log and ancillary data corresponding to the well identifier, generating and displaying a table of contents, and displaying data corresponding to ones of data types selected by a user from the table of contents.

Another aspect of the invention is a system for displaying well logging data. A system according to this aspect of the invention includes a display device operatively coupled to a first communications link. The display device is disposed at a first location. A first database is disposed at a second location. The first database is operatively coupled to the first communications link. The first database is adapted to return ancillary data corresponding to a selected wellbore upon transmission of an identifier from the display device to the first database. The system includes means for communicating well log data recorded at a wellsite to the display device. In one embodiment, a second communications link is operatively coupled between the display device and a well log recording unit at the wellsite.

BRIEF DESCRIPTION OF DRAWINGS

Other aspects and advantages of the invention will become apparent upon reading the following detailed description and upon reference to the drawings in which:

FIG. 6 shows an example of a data selection template, or "table of contents."

FIG. 11 shows an example of a tool drawing which can be displayed by selection of a "tool" data field in the template.

FIG. 12 shows an example of a calibration summary which can be returned when a "calibration" data field is selected from the template.

DETAILED DESCRIPTION

The method and system of the invention are generally related to the acquisition and presentation of well log data. The term "well log data" as used in this description is intended to include data concerning properties of earth formations as would obtained from wellbores using well logging instruments and as will be explained below with reference to FIGS. 1 and 2. However, it should be clearly understood that the term "well log data" also is intended to include other types of data acquired at the location of the well, concerning the well. Such data may include, without limitation, drilling dynamics data such as drill string torque, drill string weight, rotary drill speed, drilling fluid pump pressure and flow rate. Such data may also include descriptions of drill cuttings, drilling exponent, mud gas chromatograph and other data collectively known as "mud log" data. Accordingly, while the invention is related to acquisition of "well log" data, it should be clearly understood that they types of wellbore-related data which may be accessed and presented using a method and system according to the invention are not strictly limited to "well log" data. The types of data acquired at the wellsite may include data acquired with respect to depth in the wellbore, with respect to time, or with respect to both.

Figure 1:
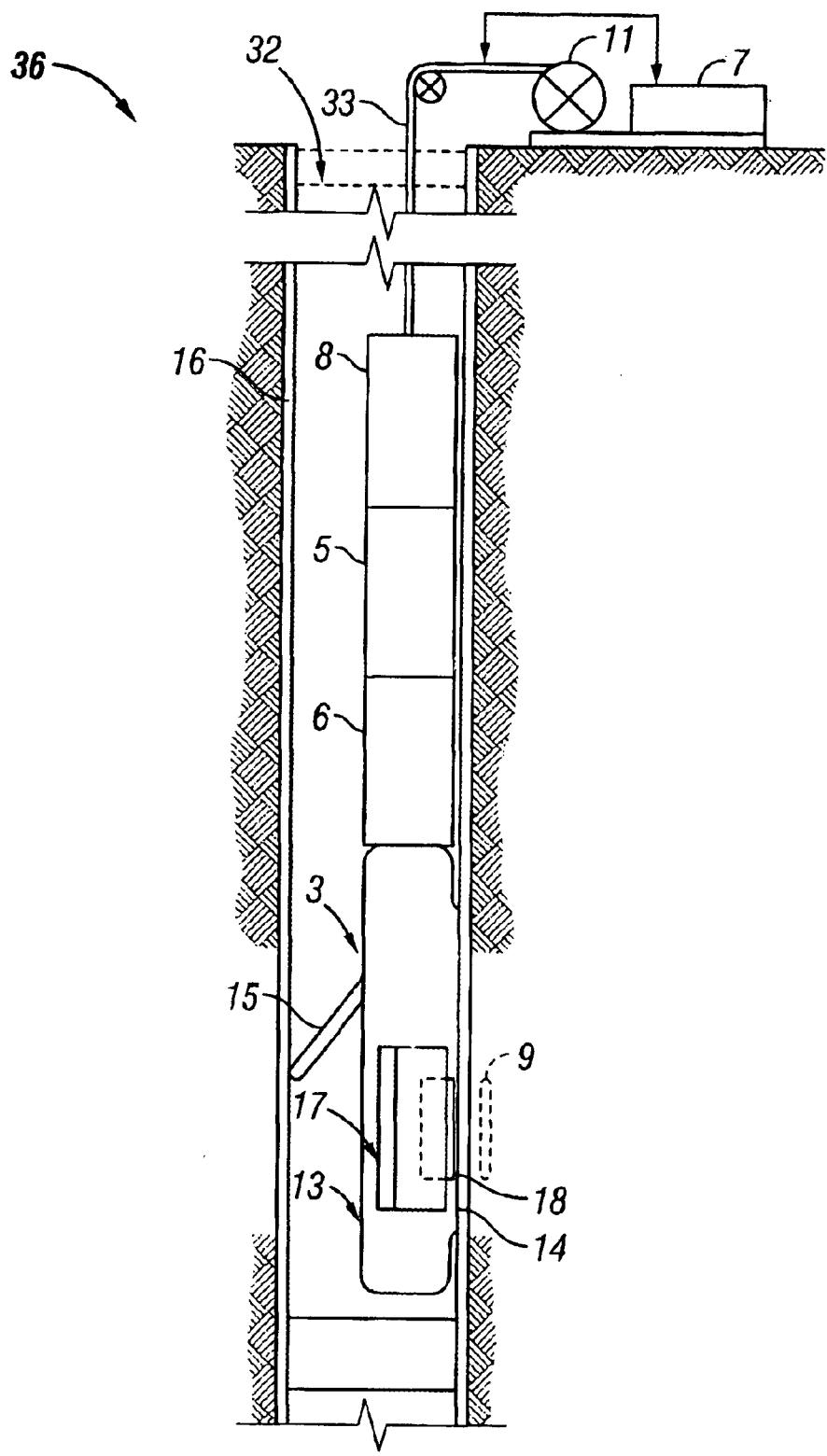
FIG. 1 shows typical well log data acquisition using a wireline conveyed instrument.

FIG. 1 shows a typical manner in which well log data are acquired by "wireline", wherein an assembly or "string" of well logging instruments (including sensors or "sondes" 8, 5, 6 and 3 as will be further explained) is lowered into a wellbore 32 drilled through the earth 36 at one end of an armored electrical cable 33. The cable 33 is extended into and withdrawn from the wellbore 32 by means of a winch 11 or similar conveyance known in the art. The cable 33 transmits electrical power to the instruments 8, 5, 6, 3 in the string, and communicates signals corresponding to measurements made by the instruments 8, 5, 6, 3 in the string to a recording unit 7 at the earth's surface. The recording unit 7 includes a device (not shown) to measure the extended length of the cable 33. Depth of the instruments 8, 5, 6, 3 within the wellbore 32 is inferred from the extended cable length. The recording unit 7 includes equipment (not shown separately) of types well known in the art for making a record with respect to depth of the instruments (sensors) 8, 5, 6, 3 within the wellbore 32.

The sensors 8, 5, 6 and 3 may be of any type well known in the art for purposes of the invention. These comprise gamma ray sensors, neutron porosity sensors, electromagnetic induction resistivity sensors, nuclear magnetic resonance sensors, and gamma-gamma (bulk) density sensors. Some sensors such as 80, 70, 60 are contained in a sonde "mandrel" (axially extended cylinder) which may operate effectively near the center of the wellbore 32 or displaced toward the side of the wellbore 32. Others sensors, such as a density sensor 3, include a sensor pad 17 disposed to one side of the sensor housing 13 and have one or more detecting devices 14 therein. In some cases the sensor 3 includes a radiation source 18 to activate the formations 36 proximate the wellbore 32. Such sensors are typically responsive to a selected zone 9 to one side of the wellbore 32. The sensor 30 may also include a caliper arm 15 which serves both to displace the sensor 30 laterally to the side of the wellbore 32 and to measure an apparent internal diameter of the wellbore 32.

The instrument configuration shown in FIG. 1 is only meant to illustrate in general terms acquiring "well log" data by "wireline" and is not intended to limit the scope of the invention.

Figure 2:
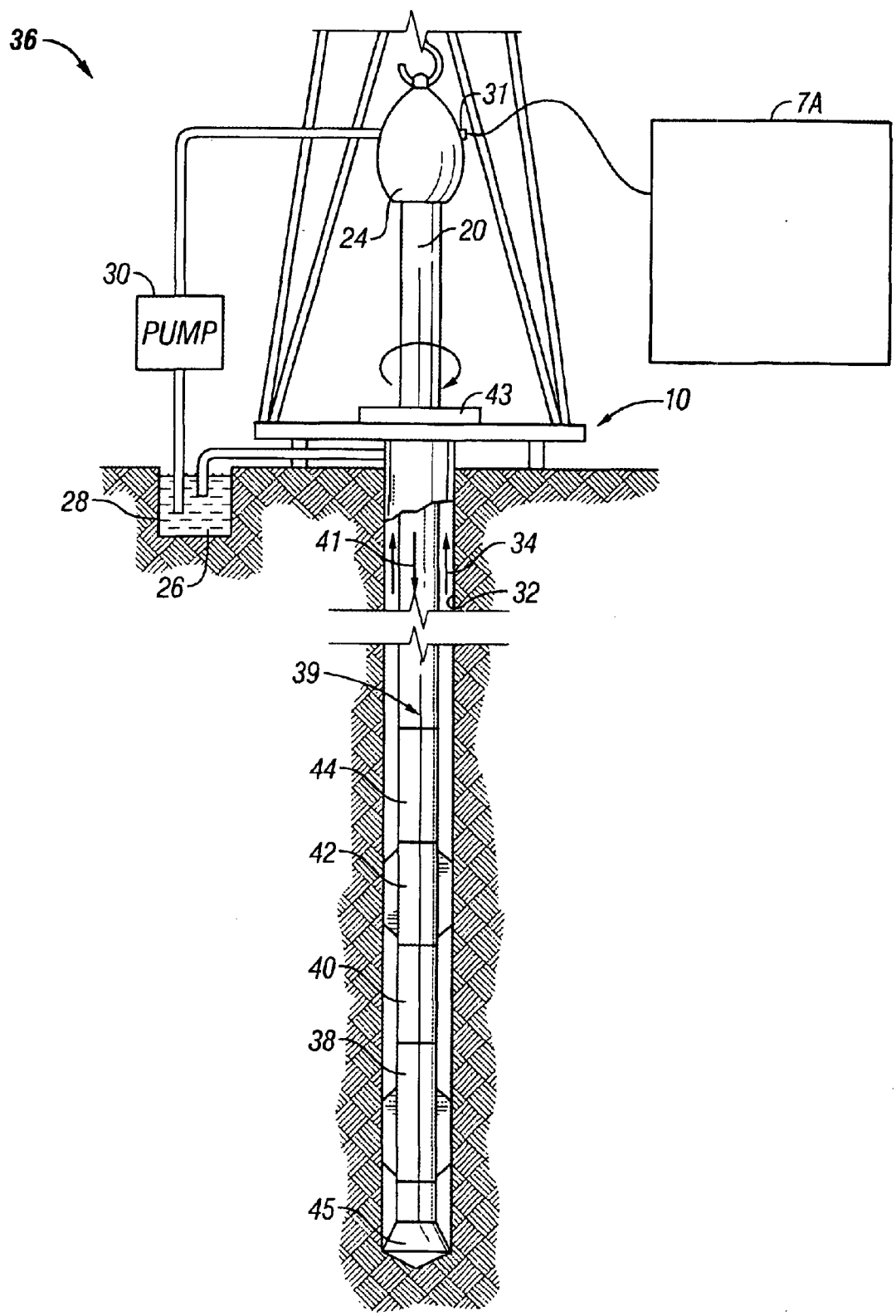
FIG. 2 shows typical well log data acquisition using a logging while drilling system.

FIG. 2 shows a typical configuration for acquiring well log data using a logging while drilling (LWD) system 39. The LWD system 39 may include one or more collar sections 44, 42, 40, 38 coupled to the lower end of a drill pipe 20. The system 39 includes a drill bit 45 at the bottom end to drill the wellbore 32 through the earth 36. Drilling is performed by rotating the drill pipe 20 by means of a rotary table 43. During rotation, the pipe 20 is suspended by equipment on a drill rig 10 including a swivel 24 which enables the pipe 20 to rotate while maintaining a fluid tight seal between the interior and exterior of the pipe 20. Mud pumps 30 draw drilling fluid ("mud") 26 from a tank or pit 28 and pump the mud 26 through the interior of the pipe 20, down through the LWD system 39, as indicated by arrow 41. The mud 26 passes through orifices (not shown) in the bit 45 to lubricate and cool the bit 45, and to lift drill cuttings in through an annulus 34 between the pipe 20, LWD system 39 and the wellbore 32.

The collar sections 44, 42, 40, 38 include sensors (not shown) therein which make measurements of various properties of the earth formations 36 through which the wellbore 32 is drilled. These measurements are typically recorded in a recording device (not shown) disposed in one or more of the collar sections 44, 42, 40, 38. LWD systems known in the art typically include one or more sensors (not show) which measure selected drilling parameters, such as inclination and azimuthal trajectory of the wellbore 32. Other drilling sensors known in the art may include axial force (weight) applied to the system 39, and shock and vibration sensors.

The LWD system 39 typically includes a mud pressure modulator (not shown separately) in one of the collar sections 44. The modulator (not shown) applies a telemetry signal to the flow of mud 26 inside the system 39 and pipe 20 where it is detected by a pressure sensor 31 disposed in the mud flow system. The pressure sensor 31 is coupled to detection equipment (not shown) in the surface recording system 7A which enables recovery and recording of information transmitted in the telemetry scheme sent by the LWD system 39. As explained in the Background section herein, the telemetry scheme includes a subset of measurements made by the various sensors (not shown separately) in the LWD system 39. The remainder of the measurements made by the sensors (not shown) in the system may be transferred to the surface recording system 7A when the LWD system 39 is withdrawn from the wellbore 32.

Just as explained with reference to the wireline acquisition method and system shown in FIG. 1, the LWD acquisition system and method shown in FIG. 1 is only meant to serve as an example of how data are acquired using LWD systems, and is not in any way intended to limit the scope of the invention.

Figure 3:
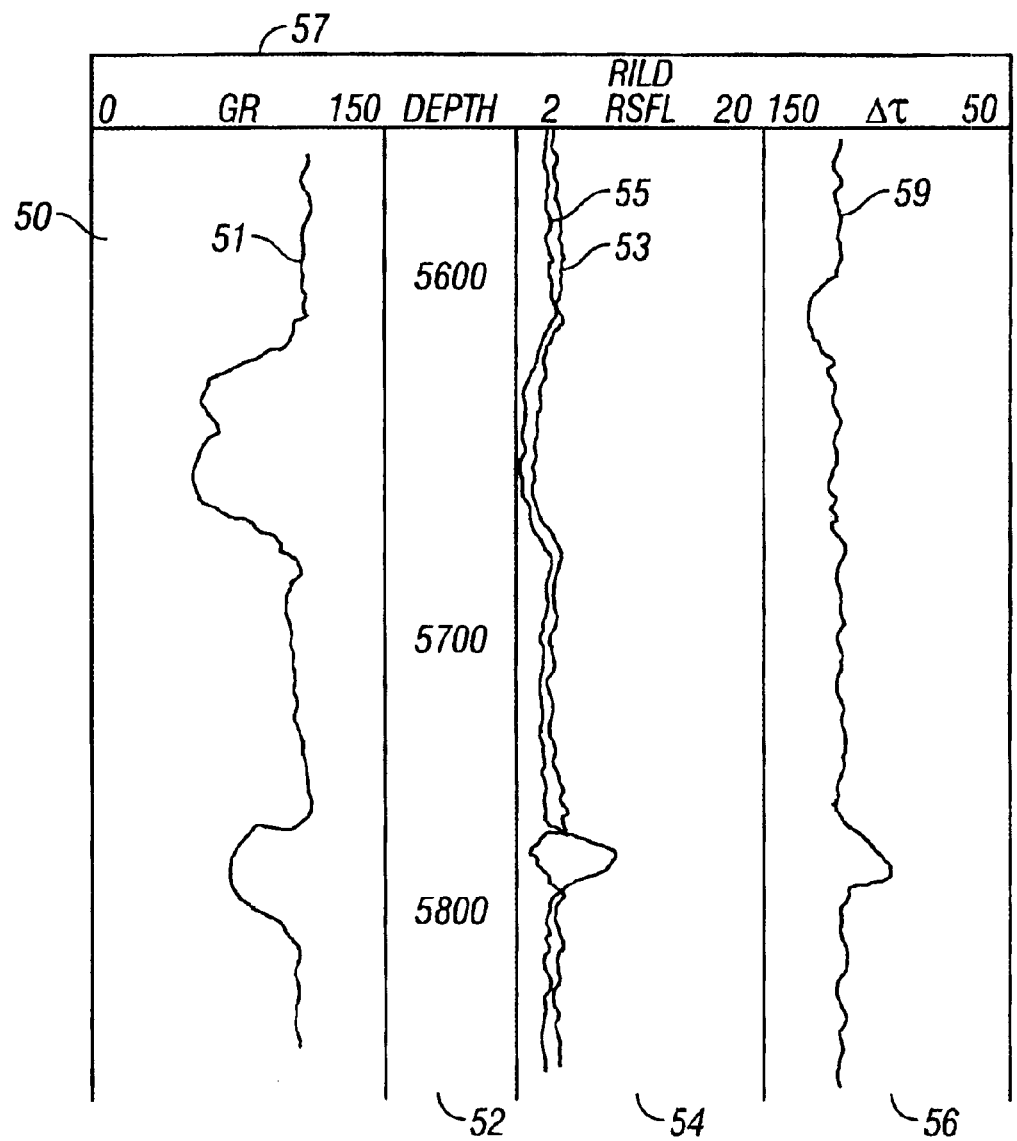
FIG. 3 shows one example of a well log data presentation.

A typical well log data presentation is shown in FIG. 3. The data presentation shown in FIG. 3 is typically made substantially entirely from data recorded by the well logging instrument and entered in the recording system by the operator at the wellsite. As explained in the Background section herein, the well log data are typically presented on a grid-type scale including a plurality of data tracks, shown as 50, 54, 56. The presentation shown in FIG. 3 is a standard format prescribed in, *Standard Practice* 31A, published by the American Petroleum Institute, Washington, D.C. which includes 3 such tracks. The tracks 50, 54, 56 include a header 57 which indicates the data type(s) for which a curve or curves, 51, 53, 55, 59 are presented in each track. A depth track 52, which shows the measured depth (or alternative depth measure such as true vertical depth) of the data is disposed laterally between the first 50 and second 54 data tracks. Data curves 51, 52, 53, 54 are presented in each of the tracks 50, 54, 56 corresponding to the information shown in the header 57. The example data presentation of FIG. 3 is only one example of data presentations which may be used with a method according to the invention and is not intended to limit the scope of the invention. A presentation such as shown in FIG. 3 may include in the various curves 51, 53, 55, 59 "raw" data, such as values of voltages, detector counts, etc. actually recorded by the various sensors in the well logging instrument (not shown in FIG. 3), or more commonly, shows values recorded by the sensors converted to values of a parameter of interest, such as natural gamma radiation level, resistivity, acoustic travel time, etc. These presentations can generally be made only from the raw data themselves and universally applied scaling and correction factors. Still other presentations of the various curves may include data to which environmental corrections have been applied. Typically, raw data and such minimally corrected data may be recorded at the wellsite without the need to enter significant amounts of data other than the data recordings from the instruments themselves.

More detailed interpretation and quality control of the well log data frequently require importing data which are available from the wellbore operator or from a central location operated by the well logging operator. In embodiments of a method according to the invention, various types of these "ancillary" data may be imported using a remote communication link to a data storage facility (or database) typically operated or maintained by the wellbore operator and/or the well logging operator. For purposes of defining the scope of the invention, the term ancillary data is used to mean any information other than the raw data obtained from the well logging instruments (or other measuring devices used at the wellsite, as previously explained) themselves from the particular wellbore being evaluated and data obtained at the wellsite concerning the physical conditions in and about the particular wellbore being evaluated.

Figure 4:
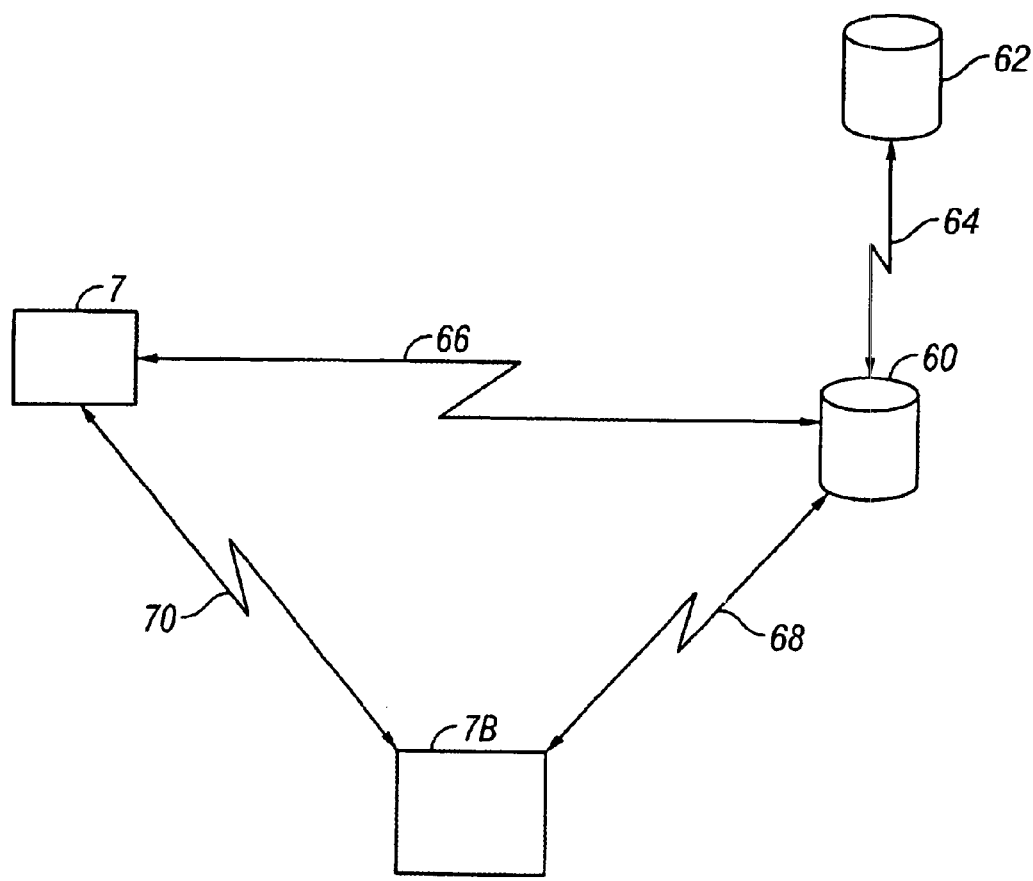
FIG. 4 shows one example of a data communication system which can be used with various embodiments of the invention.

One example of a system implementation which may use various embodiments of a method according to the invention is shown in FIG. 4. The surface recording unit 7 may be one disposed at the wellsite and substantially as shown and explained with reference to FIGS. 1 and 2. Many types of such recording units are well known in the art and may include both recording and data display systems. The surface recording unit 7, as previously explained, performs the functions of acquisition, and time to depth correlation of data measured by the various well logging instruments (not shown in FIG. 4). Data acquired and/or recorded by the recording unit 7 may be transferred after recording or substantially in real time during acquisition to a remote data presentation (or display) and processing unit or device 7B. The remote display device 7B may be any type of general purpose computer. The remote display device 7B may include systems (not shown) and/or application programs for presentation, calculation and other analysis and processing of well log data according to procedures well known in the art. Communication between the recording unit 7 and the remote display device 7B may be made over a communication link 70 of any one of a number of well known types including radio, telephone line, satellite or the Internet. Systems for remote presentation of well log data are known in the art. See, for example, U.S. Pat. No. 6,101,445 issued to Alvarado et al. and assigned to the assignee of the present invention.

In the invention, the previously referred to ancillary data typically reside in facilities operated by the well logging operator and/or the wellbore operator (oil and/or gas producing company customer). In the example of FIG. 4, ancillary data controlled by the wellbore operator may reside on a database/sever 62 controlled or otherwise selectively accessed by the wellbore operator. Ancillary data typically controlled by the wellbore operator include, for example, data records from nearby ("offset") wells, directional survey data (plots and tables including inclination and compass heading with respect to depth) of the well being analyzed, geologic maps and cross-sections of geologic structures proximate to and surrounding the wellbore being analyzed, and surface seismic survey records. Typically, the availability of ancillary data controlled by the wellbore operator is strictly limited to persons authorized by the wellbore operator, so in the, example of FIG. 4, the wellbore operator database/server 62 is shown as connected by link 64 (which also may be any suitable type of data communications link) to a database/server 60 operated by the well logging operator.

The well logging database/server 60 also includes, or has links to other databases which include, ancillary data related to the well logging instruments used such as calibration and maintenance data. Other types of ancillary data typically controlled by the well logging operator include physical descriptions and schematic representations of the various instrument types used by the well logging operator, environmental correction data, interpretation data and application programs, as examples. Ancillary data under control of the well logging operator may be communicated to the recording unit 7 or to the remote display device 7B using communication links 66 and 68, respectively. As will be further explained, the wellbore operator may grant limited access to his database/server 62 to retrieve selected ancillary data related to the wellbore of interest in order to make it available to users at the recording unit 7 and/or the remote presentation unit 7B. Availability of these data may be controlled by "tagging" such data to a "well identifier" which is any type of predetermined code or other identification which uniquely identifies the wellbore being analyzed.

The example system configuration shown in FIG. 4 is described as having a database/sever operated or controlled by the well logging operator (the well logging operator also known in the art as the "service company") and another database/server controlled or operated by the producing company or entity that is responsible for the wellbore itself (wellbore operator). It should be clearly understood for purposes of defining the scope of the invention that the entity which actually controls, physically houses, or operates the respective databases as shown in FIG. 4 is only one example of the entity which may control, operate or house the respective databases. For purposes of the invention, ancillary data are disposed on any storage medium which may be remotely accessed by an operator at the recording unit 7 and/or at the remote display device 7B. Selected types of ancillary data which require access limitations may be limited to access only by authorized persons.

Figure 5:
FIG. 5 shows an example of a well log heading.

An example of using a well identifier to retrieve selected ancillary data is shown in FIG. 5. Those skilled in the art will recognize FIG. 5 as a well log "heading", which includes data on the name of the wellbore operator 71, the identity of the well logging operator 75, the identity of the well 72, the drilling rig used to drill the well 73, and data related to the types of well logging instruments used and recording times 73. In one embodiment of the invention, when a user at the recording unit (7 in FIG. 4) or the remote presentation unit (7B in FIG. 4) enters the well identifier 73, data concerning the wellbore operator 71, rig 73 and location of the well can be accessed by automatically transmitting an inquiry to the wellbore operator database (62 in FIG. 4) either directly or through a secure access channel such as the database/link arrangement controlled by the well logging operator as shown in FIG. 4 at 60 and 64. Data relating to the location, rig, etc. may then be transmitted over the same link back to the requesting location, either the remote unit (7B in FIG. 4) or the recording unit (7 in FIG. 4). Conventionally, certain types of ancillary data, such as the aforementioned well location, operator, rig, etc. form part of the actual data record created and stored by the well logging operator. In some embodiments, therefore, the recording unit (7 in FIG. 4) will attach such returned ancillary data to the well log record made on that particular well. In other embodiments, only a record is made of the unique well identifier, and the ancillary information may be retrieved at each entry therefor from any remote presentation unit or recording unit.

In some embodiments, the well logging operator database/server (60 in FIG. 4) operates as a security screen to prevent access by users not authorized to view data associated with the particular wellbore being analyzed. For example, if the remote presentation unit (7Bin FIG. 4) is located at an office of a first wellbore operator, the well logging operator server (60 in FIG. 2) would deny data requests for any ancillary data resident on a wellbore operator server associated with another wellbore operator.

FIG. 6 shows an example of a data selection template 79 which may be used in some embodiments of the invention to enable a user to select certain data types for viewing at the recording unit (7 in FIG. 4) or at the remote presentation unit (7B in FIG. 4). The example of FIG. 4 may be in the form of a graphic user interface, wherein a cursor position is selected by a mouse to "click on" or similarly select one of the data types listed on the selection template 79. In the example of FIG. 6, the following data types and places where the data reside are as follows. Personnel 80 names are typically entered such as by keyboard entry at the recording unit (7 in FIG. 4). Once entered, these data typically form part of the data record made by the recording unit for local or remote use. In some embodiments, the personnel data field contents maybe viewed by "clicking" on the personnel data field 80 when the template 79 is displayed. In some embodiments, certain data associated with the names of the various personnel entered in the personnel data field 80 may be stored on databases such as the wellbore operator (62 in FIG. 4) or well logging operator (60 in FIG. 4) databases. This functionality enables a system user to, for example, read a brief summary about the experience and background of a particular person listed in the personnel data field 80. Security measures which may be implemented at the well logging operator server include denial of access to any wellbore operator personnel data by other than authorized wellbore operator personnel using the recording unit or remote display device. Access may be controlled by password or other security device known in the art.

Figure 7:
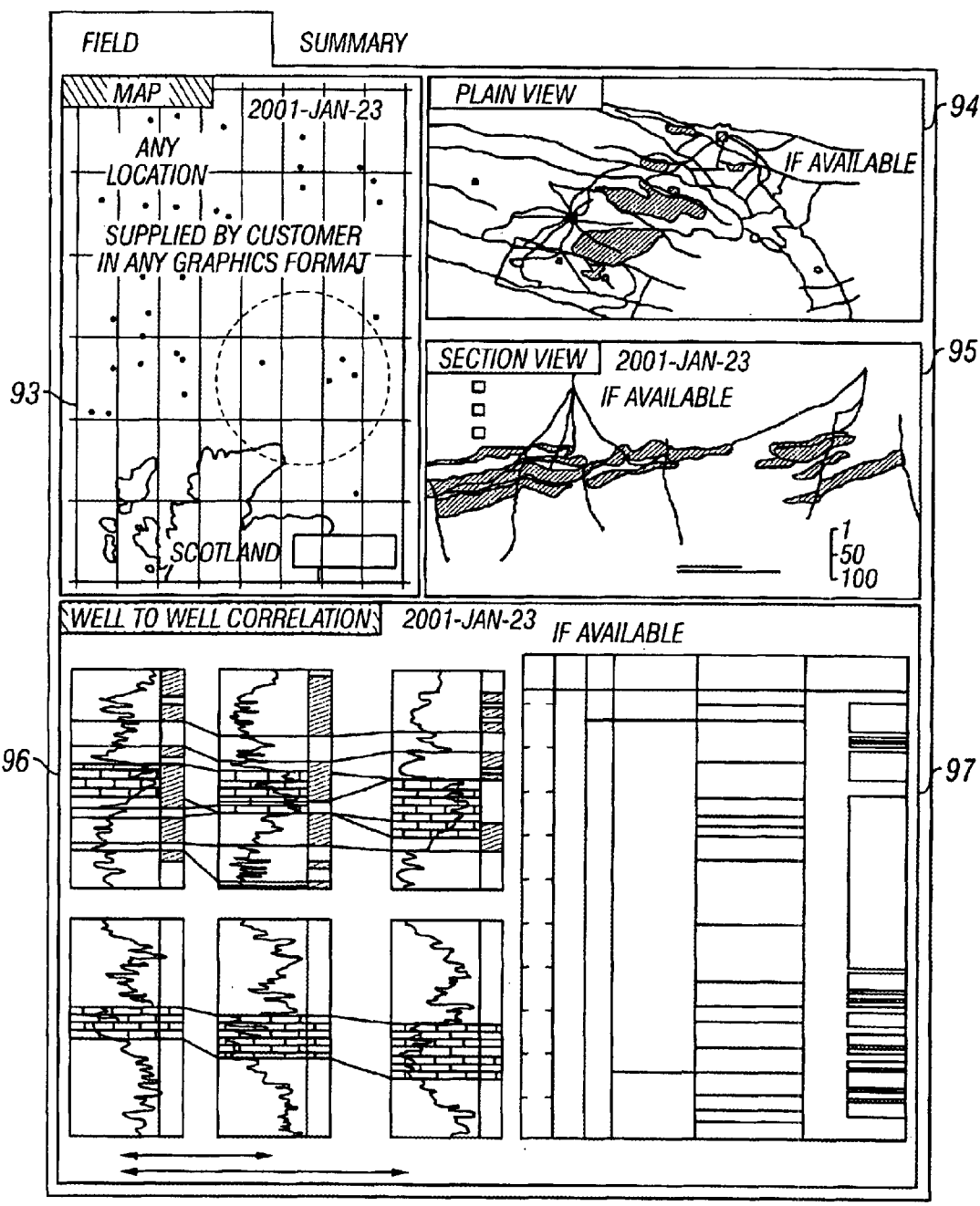
FIG. 7 shows an example of a data display returned when a "field" data field in the template is selected.

A "field" data field 81 is typically entered at the location of the recording unit (7 in FIG. 4). The example in FIG. 6 shows subfields for maps and correlation (offset) well logs. Using these subfields would typically require access to the wellbore operator database (62 in FIG. 4). It should be clearly understood that the arrangement of data fields and subfields shown in FIG. 6 is only one example of arrangement of such data access fields, and is not intended to limit the scope of the invention. An example of various data types which may be accessed and displayed by the recording unit (7 in FIG. 4) or remote display device (7A in FIG. 4) by selecting the "field" data field 81 is shown in FIG. 7. The data shown in FIG. 7 include a geographic location map 93, a subsurface structure map 94 drawn to a selected geologic stratum or layer, a cross-section 95, offset wellbore correlation logs and sections 96, and a geologic stratigraphy section 97. In some embodiments, moving the display cursor over one of the presented data types can cause the display in the recording unit or remote display device to display the selected data in a larger scale, or may alternatively provide a link to related data. The data presented in FIG. 8 are only an example of the types of data which may be displayed by selected one of the data fields of FIG. 6, and therefore the example of FIG. 7 should not be construed as a limitation on the invention.

A "well" data field 82 can access display of data on the rig type, well plan, wellbore trajectory both planned and actual and properties of the drilling fluid. Of these data, the actual well trajectory is typically entered at the location of the recording unit (7 in FIG. 4). Other data are typically accessed from the wellbore operator database (62 in FIG. 4). An example of data which may be presented by selecting the "well" data field is shown in FIG. 8. The display of FIG. 8 includes a vertical plane presentation of the wellbore trajectory 98 which may be entered at the recording unit from a directional survey made available by the wellbore operator. A horizontal plane presentation of the wellbore trajectory is shown at 99 in FIG. 8. A depiction of the drilling rig used to drill the wellbore is shown at 100. The depiction of the rig may be made available for display in some embodiments by interrogating the well logging operator database (60 in FIG. 4) or by interrogating the wellbore operator database (62 in FIG. 4).

Figure 9:
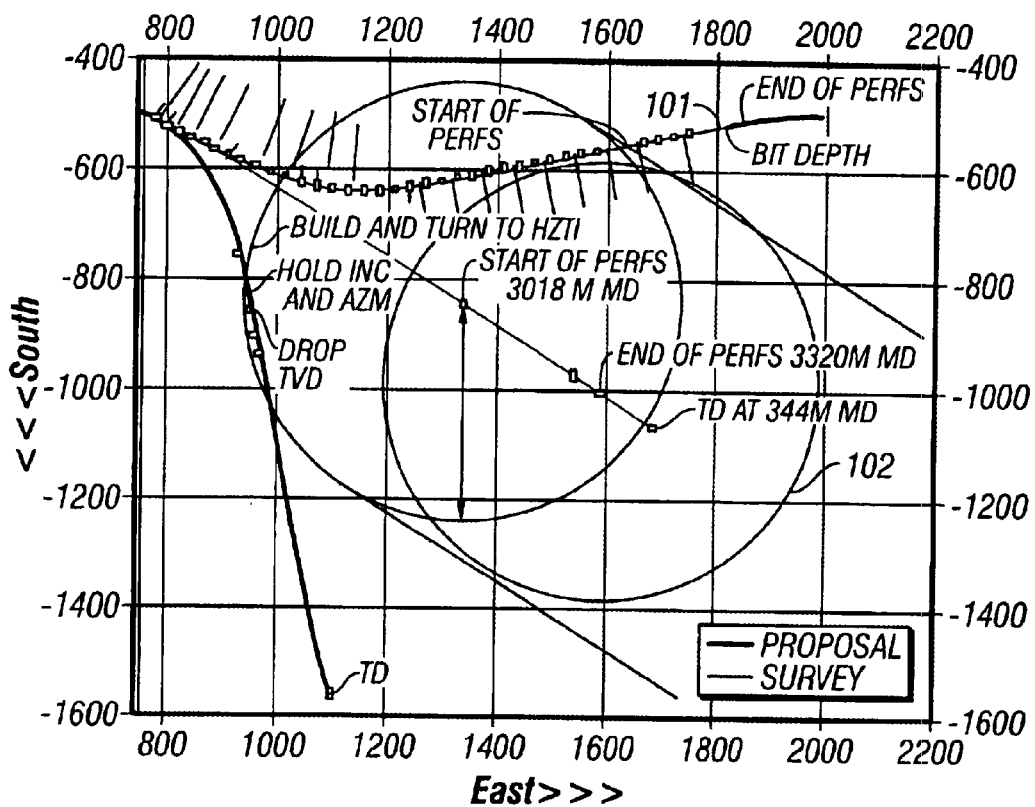
FIG. 9 shows an example of a data display returned when a "wellpath" data subfield in the template is selected.
Figure 10:
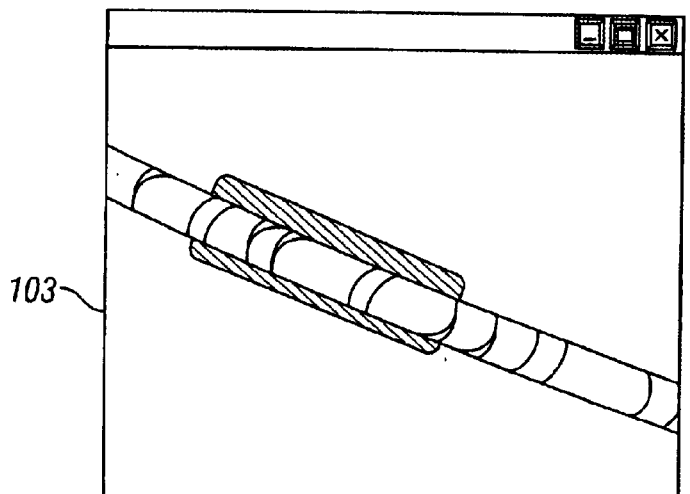
FIG. 10 shows an example of a data display returned when an application field or subfield in the template is selected.

In some embodiments, selecting or "clicking" on selected well trajectory diagrams may be used as an operator input to cause the remote display device (7B in FIG. 4) or the recording unit (7 in FIG. 4) to import a selected application which may be used to display selected well log data recordings in a, particular manner. A 3-dimensional viewing application is shown at 103 in FIG. 10. This 3-dimensional application displays a selected portion of the well log data in a manner similar to a visual image of the wall of the wellbore. A trajectory of the wellbore corresponding to the selected well log data may be imported from a directional survey used to generate the well trajectory plots as explained with reference to FIG. 9. Any 3-dimensional software application adapted to run the described data as described herein can be used to implement the invention.

Figure 8:
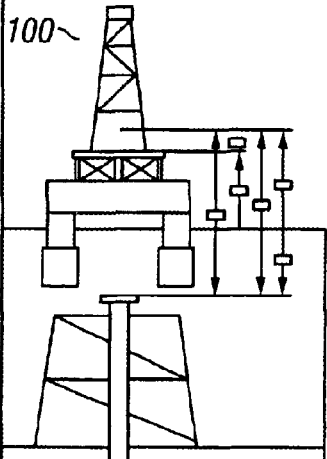
FIG. 8 shows an example of a data display returned when a "well" data field in the template is selected.

In some embodiments, more detailed information related to one of the selected data presentations on the display of FIG. 8 may be accessed by moving the cursor to the particular data presentation and "clicking" on that display. For example, selecting the horizontal plane well trajectory display (also referred to as a well path display) 99 may cause the display device to include data such as perforations in a completed adjacent wellbore, such as shown at 101 in FIG. 9, or maximum error areas for the wellbore trajectory, such as shown at 102 in FIG. 9. These data may be made available in some embodiments, by interrogating the wellbore operator database (62 in FIG. 4).

An "equipment" data field 83 presents a list of the well logging instruments actually used in the particular wellbore. Typically, information such as instrument type and serial number are entered such as by keyboard entry at the location of the wellbore being evaluated. Ancillary data associated with instrument type and serial number may include calibration and maintenance records, a drawing of each particular instrument, descriptions of various instrument specifications, such as "measure point" (axial position at which the sensors in the instrument generally correspond in measurement made) and the like. Much of this data is typically resident at a facility controlled by the well logging operator. Prior art systems included local storage of instrument diagrams, for example, but typically did not include more detailed data sheets such as would ordinarily be found in publications such as the well logging operator's service catalog. In the invention, selection to view selected aspects of the "equipment" data field 83 may access such information stored in the well logging operator database (60 in FIG. 4) and display these data at the recording unit (7 in FIG. 4) or the remote display device (7B in FIG. 4) without the need to physically transport such data or make them part of the well data record for the particular well. One example of information typically stored in the well logging operator database (60 in FIG. 4) is shown in FIG. 11. A tool drawing 104 may include such information as a cross-sectional or cutaway view of a well logging instrument, and selected operating specifications. Drawings such as shown in FIG. 11 are typically found in well logging operator printed catalogs for distribution to customers.

A "software" data field 84 can be presented to display the version of system operating software used in the recording unit (7 in FIG. 4) and in the particular logging instruments being used. Recording unit software information ordinarily would be accessed at the recording unit (7 in FIG. 4). Data on the software version used in any particular downhole instrument in some embodiments would be remotely accessed from the well logging operator database (60 in FIG. 4). Alternatively, instrument software data may be resident in the instrument itself, and made available to the recording unit (7 in FIG. 4) upon interrogation of the recording system (not shown in the Figures) resident in the LWD system (39 in FIG. 2).

A "calibration" data field 85 is shown as a separate field in FIG. 6, but may be included as a subfield of the equipment data field 83. Calibration data may include field "calibration" data (more properly understood as field verification of the sensor operation) which is ordinarily recorded at the wellsite, and may include so-called "shop" calibration data, wherein well logging operator personnel periodically check the sensor operation of various sensors in a special fixture or calibration facility. Records of "shop" calibrations are ordinarily stored at a well logging operator controlled facility. In embodiments of the invention, entry of the instrument serial number and a request "clicked" on the appropriate part of the calibration field 85 will transmit a request for such shop calibration information from the recording unit (7 in FIG. 4) or from the remote display device (7B in FIG. 4). Upon receipt by the well logging operator database/server (60 in FIG. 4), the data will be sent over the selected link to the requesting location, either the recording unit (7 in FIG. 4) or from the remote display device (7B in FIG. 4). An example of a "shop" calibration record which may be generated and displayed at the recording unit or the remote display device is shown in FIG. 12. The data used to generate the display of FIG. 12 may be obtained by interrogating the well logging operator database by selecting the "calibration" data field (85 in FIG. 6). Data obtained by instrument verification at the wellsite may be merged into the calibration data presentation in some embodiments.

An "environmental corrections" data field 86 may include data about the particular wellbore which are entered at the wellsite (recording unit 7 in FIG. 4). Algorithms (also in the form of graphically displayed "charts") used to make environmental corrections are typically disposed at a well logging operator controlled facility. In the prior art, this information needed to be physically transported to the wellsite or location of a remote presentation unit. In some embodiments of the invention, a request to see this information may be transmitted to the well logging operator database/server (60 in FIG. 4) for transmission to the recording unit (7 in FIG. 4) or the remote presentation unit (7B in FIG. 4).

Of the remaining data fields, the following typically include data which is entered into the recording unit (7 in FIG. 4) at the wellsite and form part of the permanent data record for the wellbore being evaluated: a "remarks" data field 87; an "acquisition" data field 89; a "digital product" data field 90 and a "main log" data field 91. The main log data field 91 is the set of instrument measurements recorded with respect to depth and/or time by the recording unit (7 in FIG. 4). A "job planning" data field 90 may include some information, such as objectives and data requirements which reside on the wellbore operator server/database (62 in FIG. 4). Other data associated with the "job planning" data field 90 may be entered locally at the recording unit (7 in FIG. 4) or may reside on the well logging operator server/database (60 in FIG. 4).

The invention may be implemented as a software product which operates on a well logging surface recording system or at a remote display device that allows the user to navigate through the many areas or dimensions of collected data. The data are organized and presented in an electronic form which is standardized, logical and is easy to read and understand. The invention may be implemented to link together all areas of a specific project or to link different projects together. This makes it easier for all those involved to access, follow and disseminate the information.

The invention makes it possible to standardize a data delivery product while still allowing users to customize the data in a form conducive to their needs. If the user needs additional data which is not part of the recording made at the wellsite, or a question arises, data relevant to the particular question may be retrieved from the wellbore or well logging operator databases in a relatively short time to provide access to the desired information.

It will be appreciated that the present invention may be implemented in a program storage device readable by a processor and encoding a program of instructions including instructions for performing the operations described herein. By programming one or more suitable general-purpose computers having appropriate hardware, the present invention provides a new method for performing/providing business services and applications. The programming may be accomplished through the use of one or more program storage devices readable by the computer processor and encoding one or more programs of instructions executable by the computer for performing the operations described above. The program storage device may take the form of, for example, one or more floppy disks; a CD-ROM or other optical disk; a magnetic tape; a read-only memory chip (ROM); and other forms of the kind well known in the art. The program of instructions may be "object code," i.e., in binary form that is executable more-or-less directly by the computer; in "source code" that requires compilation or interpretation before execution; or in some intermediate form such as partially compiled code.

The following table lists types of data which may be accessed and displayed using a system according to the invention. It should be understood that the data types listed are not intended to be an exhaustive representation of the types of data which may be used in a system and method according to the invention, and that other types of data may be accessed and displayed without departing from the scope of the invention. Data types in the table below marked with an asterisk (*) are typically (but not exclusively) "ancillary" as that term is used in the description of the invention.

DATA TYPES

1. Well Construction

BHA (Bottom Hole Assembly)
- Mechanical Specifications; Fishing Diagram, Flowrate *
- Measurement Specifications; Accuracy, Precision *
- Measurement Summary
- Gamma Ray
- Resistivity
- Equipment History: Maintenance, Calibration *
- Remarks
- Other data and/or application software Well Data
- Well path
- Survey
- Tubular
- Drilling Fluid data
- Other data and/or application software 2. Petrophysical Gamma Ray Curve
- Equipment in BHA, Bottom Hole Assembly
- Mechanical Specifications; Fishing Diagram, Flowrate specifications *
- Measurement Specifications; Accuracy, Precision *
- Equipment History: Maintenance, Calibration *
- Remarks
- Digital Data
- Data Dictionary *
- Other related data channels
- Calibration and History *
- Measurement relative to single wellbore or multiple wellbore *
- Correlation with Geophysical data *
- Environmental Correction Charts *
- Remarks 3. Geological Field Data
- Structural map *
- Geological target *
- Well to Well Correlation *

Well Data
- Geological Target *
- Well path
- Survey
- Tubular
- Drilling Fluid data
- Borehole parameters
- Control Parameters used to acquired the well log data

Examples of Data Access by Category

1. Calibration and Historical Records
   - Table of Contents
   - BHA, Bottom Hole Assembly
   - Calibration Summary
   - Measurement Curve/Log
2. Measurement Specification
   - BHA, Bottom Hole Assembly
   - Measurement Curve/Log
   - Measurement Uncertainties
3. Remarks
   - Table of Contents
   - BHA, Bottom Hole Assembly
   - Measurement Curve/Log
4. BHA (Bottom Hole Assembly)
   - Table of Contents
   - Measurement Curve/Log

Example of Presentation Table of Contents

1. Header
   - Company Name
   - Field Name
   - Service/Product Name
   - Acquisition Summary
2. Table of Contents
   - Disclaimer
   - Electronic Log Contents
   - Others data and/or access to other data if required
3. Personnel
   - Client Representative
   - Field Engineer
4. Field
   - Well Map
   - Correlation Log
5. Well
   - Rig Diagram *
   - Geological Target *
   - Survey
   - Trajectory
   - Fluid data/Mud Properties
6. Equipment Diagram (BHA)
   - Description *
   - Tool length and size *
   - Measure points *
   - Sensor orientation *
   - Stabilizer Size *
   - Others data and/or access to other data if required
7. Software
   - Downhole *
   - Surface *
   - Other data and/or access to other data if required *
8. Calibration
   - Verification in Field
   - Periodic Maintenance Calibration Data *
   - Other data and/or access to other data if required *

9. Environmental Correction
   Borehole
   Formation
10. Remarks
   Operating condition
   Environment
   Anomalies
11. Job Planning
   Objectives *
   Measurement requirement
   Operating procedure and limitations
   Other data and/or access to other data if required *
12. Acquisition
   Depth versus Time
   Data points
   Update rate
   Filtering
13. Digital Product
   Data type
   Verification
   Other data and/or access to other data if required *
14. Log
   Main log
   Repeat log
   Time Lapse log
   Other data and/or access to other data if required *

Referring once again to FIG. 6, another aspect of the invention will be explained. Well log presentations known in the art are intended to substantially replicate well log data presentations used at a time when well log data were acquired and recorded in analog form. In analog data recording, information relating to the conditions of the wellbore being evaluated were typically hand-recorded on the log heading (FIG. 5). Descriptions and information concerning the actual logging instruments used at the particular wellbore were similarly recorded. These data were typically presented on a "trailer" which followed or was otherwise inserted in a continuous log data presentation including the heading (see FIG. 5) and the log data themselves (see FIG. 3). Digitally stored versions of such well log presentations are intended to substantially reproduce this type of well log presentation. Viewing and access of the ancillary data is limited in well log presentations known in the art. Recalculation and other analysis of well log data using presentation techniques, known in the art includes generation of a new, complete presentation for the analyzed data.

In a method according to this aspect of the invention, a table of contents, such as shown at 79 in FIG. 6 is generated for the wellbore being evaluated. The table of contents 79, as previously explained, can be arranged to display selected data fields, such as shown at 80–91 in FIG. 6. In this aspect of the invention, the table of contents 79 provides links to selected data concerning the wellbore being evaluated and ancillary data for that wellbore. The ancillary data may be available at the recording unit (7 in FIG. 4) and/or at the remote display device (7B in FIG. 4). Alternatively, the ancillary data may be accessed by link as explained previously with reference to FIG. 4. In the invention, the well identifier (72 in FIG. 5) becomes a key by which all other data relating to the particular well are accessed and presented. Such identification makes it unnecessary to generate a new specific presentation for each type of analysis performed while or subsequent to recording of the well log data. In some embodiments, it is unnecessary to record the ancillary data for each analysis performed on the well log data. In such embodiments, instructions to access relevant ancillary data may be keyed to appropriate locations on the table of contents, so that a user may access the ancillary data relating to the particular analysis or presentation as needed by the user.

In some embodiments according to this aspect of the invention, a data presentation selected from one or more data fields in the table of contents 79 will cause the remote display device or the recording unit to display the selected data. As previously explained with respect to FIGS. 7–12, sections of such data displays may be keyed to provide a link to a selected application program for viewing or analyzing the selected data, or may provide a link to corresponding ancillary or related data. This feature provides the system user with the ability to quickly and conveniently access any data an/or applications relevant to the particular data being viewed or analyzed. As one example, wellbore image data may be viewed using a particular viewing program, such as explained with respect to FIG. 9.

Figure 13:
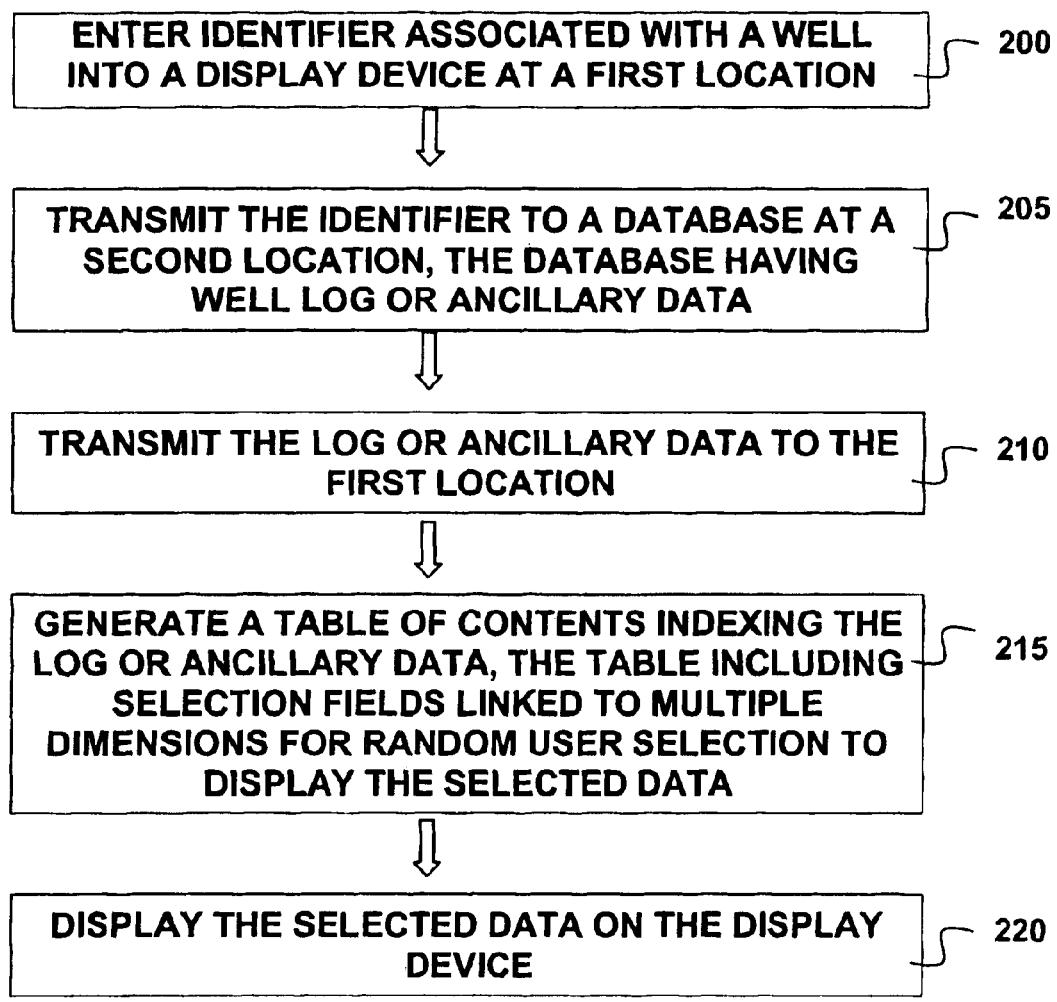
FIG. 13 shows a flow chart of a process according to the invention.

FIG. 13 shows a flow chart of a process according to the invention. At 200, an identifier associated with a well is entered into a display device at a first location. At 205, the identifier is transmitted to a first database having well log data or ancillary data therein, the first database disposed at a second location. The well log data or ancillary data is then transmitted to the first location at 210. At 215, a table of contents indexing the well log or ancillary data is generated for display, the table having selection fields linked to multiple data dimensions so that random user selection causes the data to be displayed on the display device. Then at 220, the selected well logy or ancillary data is displayed on the display device.

For the purposes of this specification it will be clearly understood that the word "comprising" means "including but not limited to", and that the word "comprises" has a corresponding meaning.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for viewing well log data, comprising:
   entering an identifier associated with a well into a display device disposed at a first location;
   transmitting the identifier to a first database having well log data or ancillary data therein, the first database disposed at a second location;
   transmitting the well log data or ancillary data to the first location;
   generating a table of contents indexing the well log or ancillary data for display on the display device, the table having selection fields therein linked to multiple dimensions of said data so that random selection by a user of data from any of the multiple dimensions causes said data to be displayed on the display device; and
   displaying selected well log data or ancillary data on the display device.

2. The method as defined in claim 1, further comprising:
   transmitting the identifier to a second database having well log or ancillary data therein corresponding to the identifier, the second database disposed at a third location;

transmitting the well log or ancillary data from the second database to the display device; and presenting said data from the second database on the display device.

3. The method as defined in claim 2 wherein the second database is controlled by a wellbore operator.

4. The method as defined in claim 2 wherein the transmitting the well identifier comprises transmitting thereof from the first database to the second database, the method further comprising determining an identity of a user of the display device and preventing transmission of the identifier to the second database when the user is not an authorized person.

5. The method as defined in claim 2 wherein the ancillary data in the second database comprise at least one of a geologic structure map and an offset well log.

6. The method as defined in claim 1 wherein the ancillary data in the first database comprise at least one of well logging instrument calibration data, well logging instrument drawings, and environmental correction data related to a well logging instrument used to generate the data recorded from the well logging instrument.

7. The method of claim 1 wherein the ancillary data in the first database comprise at least one application program.

8. The method as defined in claim 1 wherein the first location as separate from the location of the well, the method further comprising transmitting the data obtained from a well logging instrument to the location of the display device.

9. The method of claim 1 wherein the first database is controlled by a well logging operator.

10. The method of claim 1 wherein the display device comprises a computer.

11. The method of claim 1 wherein the display device forms part of a well log recording unit.

12. A method for viewing well log data, comprising:

entering an identifier associated with a well into a display device;

accessing well log data or ancillary data corresponding to the identifier, said data residing at a location remote from the display device;

generating and displaying a table of contents indexing the accessed well log data or ancillary data on the display device, the table having selection fields therein linked to multiple dimensions of said data so that random selection by a user of data from any of the multiple dimensions accesses said data; and displaying data randomly selected by a user from any of the multiple data dimensions linked to the table of contents.

13. The method as defined in claim 12 wherein the selected data includes at least one of log data recorded at a wellsite, shop calibration data corresponding to well logging instruments used to record the data at the wellsite and offset correlation log data.

14. The method as defined in claim 12 wherein the data displayed includes links therein to the ancillary data and an application program for processing the displayed data.

15. The method as defined in claim 12 wherein the table of contents includes links therein to the ancillary data and an application program for processing the data.

16. The method as defined in claim 12 wherein the selected data is accessed by a communications link to a database disposed at a location separate from a location at which the display device is located.

17. The method as defined in claim 16 wherein the data is accessed by a communications link from the first database to a second database disposed at a location separate from the location of the first database and location of the display device.

18. The method as defined in claim 17 further comprising determining an identity of a user at the display device, and enabling access to ancillary data on the second database only if the identified user is an authorized user.

19. The method as defined in claim 16 wherein the communications link comprises an Internet link.

20. The method as defined in claim 12 wherein the display device comprises at least one of a component in a well logging recording unit disposed at a wellsite and a computer disposed at a location separate from the wellsite.

21. A system for displaying well logging data, comprising:

a display device operatively coupled to a first communications link, the display device at a first location;

a first database disposed at a second location, the first database operatively coupled to the first communications link;

means for transmitting a request for well log or ancillary data from the display device to the first database upon entering an identifier associated with a well to the display device;

means for communicating the requested well log or ancillary data to the display device; and means for generating a table of contents indexing the communicated well log or ancillary data for display on the display device, the table having selection fields therein linked to multiple dimensions of said data so that random selection by a user of data from any of the multiple dimensions causes said data to be displayed on the display device.

22. The system as defined in claim 21 further comprising a second database operatively coupled to a second communications link, the second database adapted to transmit well log or ancillary data to the display device upon receipt therefrom of the identifier.

23. The system as defined in claim 22 wherein the second communications link is operatively coupled between the first database and the second database, and wherein at least one of the first and second databases comprises means for controlling transmission of the identifier to the second database based on identification of an authorized user at the display device.

24. The system as defined in claim 21 wherein the display device forms part of a well logging recording unit.

25. The system as defined in claim 21 wherein the display device forms part of a well log recording unit adapted to directly display well log data.

26. The system as defined in claim 21 wherein the display device is disposed at a location separate from the wellsite and the means for communicating the well log or ancillary data comprises a third communications link operatively coupled between the display device and a well log recording unit at the wellsite.

27. The system as defined in claim 26 wherein the display device includes means for transmitting a data request over the third communications link such that selection of data from the table of contents causes transmission of the data request over the third communications link to the recording unit, the means for transmitting the data request adapted to receive well log or ancillary data returned to the display device over the third communications link.

28. The system as defined in claim 21 further comprising a second database operatively coupled to a second communications link, the second database adapted to transmit well log or ancillary data to the display device upon receipt therefrom of the identifier.

29. The system as defined in claim 28 wherein the means for generating the table of contents is adapted such that selection of data from the table results in communication of the identifier to at least one of the first and second databases, the display device adapted to receive the selected data from the at least one of the databases for display thereon.

* * * * *